(12) United States Patent
Roberts

(10) Patent No.: US 7,132,981 B1
(45) Date of Patent: Nov. 7, 2006

(54) METHOD OF LOCATING OBJECT USING PHASE DIFFERENCES AMONG MULTIPLE FREQUENCY BEACONS TRANSMITTED FROM SPACED APART TRANSMITTER SITES

(75) Inventor: Richard D. Roberts, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 11/145,767

(22) Filed: Jun. 6, 2005

(51) Int. Cl.
*G01S 5/06* (2006.01)
(52) U.S. Cl. ..................................... 342/442; 342/464
(58) Field of Classification Search ........... 342/357.01, 342/357.06, 442, 450, 464; 701/207, 213
See application file for complete search history.

(56) References Cited

U.S. PATENT DOCUMENTS

| | | | | |
|---|---|---|---|---|
| 4,028,703 A | * | 6/1977 | Honore et al. ............... 342/393 |
| 4,060,809 A | * | 11/1977 | Baghdady .................... 342/451 |
| 6,275,705 B1 | * | 8/2001 | Drane et al. .............. 455/456.2 |
| 2002/0126046 A1 | * | 9/2002 | Counselman et al. ....... 342/464 |
| 2005/0206555 A1 | * | 9/2005 | Bridgelall et al. .......... 342/127 |

* cited by examiner

*Primary Examiner*—Dao L. Phan
(74) *Attorney, Agent, or Firm*—Allen, Dyer, Doppelt, Milbrath & Gilchrist, P.A.

(57) ABSTRACT

A technique for geolocating (mobile) objects within an environment where other locating systems, such as GPS-based systems, may not be expected to operate successfully, uses at least three transmitter sites whose geolocations are fixed and known, and which transmit dual frequency beacons that are readily received by a mobile receiver within the environment of interest. The object's receiver processes the three sets of received signals by measuring the phase differences among respective pairs of the beacons, and then processes these phase differences to perform time difference of arrival-based or time of arrival-based distance information to locate the object relative to the beacons sites. Phase errors or offsets are readily calibrated out, to realize geolocation information at the mobile receiver.

20 Claims, 5 Drawing Sheets

METHOD OF LOCATING OBJECT USING PHASE DIFFERENCES AMONG MULTIPLE FREQUENCY BEACONS TRANSMITTED FROM SPACED APART TRANSMITTER SITES

FIELD OF THE INVENTION

The present invention relates in general to communication systems and subsystems thereof, and is particularly directed to a new and improved technique for geolocating an object by measuring the phase differences of a plurality (e.g., three) multi-frequency beacons that are transmitted from an associated plurality of transmitter sites spaced apart from each other and from the object.

BACKGROUND OF THE INVENTION

The desire to locate and/or track an object, such as a vehicle or person, is a major objective of a variety of enterprises, such as but not limited to transportation, military and fire and rescue institutions. To this end, the use of the global positioning satellite (GPS) network has and continues to enjoy widespread use throughout the world. Unfortunately, GPS location and tracking is not an all inclusive technique, as it generally requires that the GPS receiver be located outdoors, where there is a substantially unobstructed path between the GPS receiver and the GPS satellite network. GPS systems suffer when the receiver is subject to significant obstruction, such as in the interior of a building, particularly the lower floors or an underground location (e.g., basement or parking garage). While the temporary impairment to or loss of GPS functionality may be tolerated as an inconvenience in some circumstances, there are a number of situations, such as during a fire and rescue operation, where the locations of high valued assets, such as fire and rescue personnel within a building, must be known and tracked on a continuous basis.

SUMMARY OF THE INVENTION

In accordance with the present invention, this objective is successfully addressed by means of a multi-frequency beacon-based technique for locating the position (geographical coordinates) of an object by measuring the phase differences of a plurality (e.g., three) multi-frequency beacons transmitted from an associated plurality of transmitter sites spaced apart from each other (outside the enclosed areas of interest, such as may be distributed around a parking lot) and from a receiver attached to or carried by the object within the building. In order to facilitate an understanding of the underlying communication mechanism employed by the present invention to locate an object relative to a set of at least three fixed multi-frequency beacon transmitter sites, consider the operation and functionality of an arbitrary pair of transmitters relative to a mobile receiver whose geographical location relative to the two transmitters is to be determined. The first beacon transmitter transmits a pair of fixed RF tones F10 and F11, while a second beacon transmitter transmits a different pair of fixed RF frequencies F20 and F21. The transmitted tone pairs transmitted by each beacon site are such that the difference between the frequencies of each pair is the same. For example, one beacon site may transmit the frequency pair 1.0 MHz and 1.1 MHz, while another beacon site may transmit the frequency pair 1.2 MHz and 1.3 MHz, providing a common frequency difference of 100 KHz.

How the time difference of arrival between these pairs of beacons are derived will be explained; namely, how to ascertain time differences $t_2-t_1$ will be described. This will then be extended to the general case of at least three beacons as would be used for localization based upon a time difference of arrival (TDOA) algorithm, as well as a time of arrival (TOA) algorithm.

The beacon signals transmitted by the respective transmitters T1 and T2 are the signals $S_1$ and $S_2$, which are defined as:

$$S_1 = e^{j\omega 10 t + \theta 10} + e^{j\omega 11 t + \theta 11}$$

$$S_2 = e^{j\omega 20 t + \theta 20} + e^{j\omega 21 t + \theta 21}$$

The signals received at the mobile receiver RX are therefore the signals:

$$S_1' = e^{j\omega 10(t+\tau 1) + \theta 10} + e^{j\omega 11(t+\tau 1) + \theta 11}$$

$$S_2' = e^{j\omega 20(t+\tau 2) + \theta 20} + e^{j\omega 21(t+\tau 2) + \theta 21}$$

In this set of equations, the second term on the right hand side is multiplied by the complex conjugate of the first term on the right hand side. This can be done one of two ways. First, either multiply $S'_1$ and $S'_2$ by its own complex conjugate and then low pass filter the product or, alternatively, filter out the $\omega_{10}$ signal from the $\omega_{11}$ signal and then conjugate and multiply. The latter method is readily accomplished by Fast Fourier Transform (FFT) processing in the digital signal processing domain and it is therefore preferred.

Working with the components of signals $S_1$ and $S_2$, a pair of beat note signals are derived as:

$$\Omega_1 = e^{-j\omega 10(t+\tau 1) - \theta 10} \cdot e^{j\omega 11(t+\tau 1) + \theta 11} = e^{j(\omega 11 - \omega 10)(t+\tau 1) + (\theta 11 - \theta 10)}$$

$$\Omega_2 = e^{-j\omega 20(t+\tau 2) - \theta 20} \cdot e^{j\omega 21(t+\tau 2) + \theta 21} = e^{j(\omega 21 - \omega 20)(t+\tau 2) + (\theta 21 - \theta 20)}$$

These beat note frequencies are dependent on the frequency differences between the two transmitted tones. As pointed out above, pursuant to the invention, the system is configured so that the beat note is the same frequency for $\Omega_1$ and $\Omega_2$; that is, the difference between each pair of tones is defined as:

$$\Delta\omega = \omega_{11} - \omega_{10} = \omega_{21} - \omega_{20}$$

The above expressions may be respectively rewritten as:

$$\Omega_1 = e^{j(\Delta\omega)(t+\tau 1) + (\theta 11 - \theta 10)}$$

$$\Omega_2 = e^{j(\Delta\omega)(t+\tau 2) + (\theta 21 - \theta 20)}$$

Next, a complex conjugate multiplication is performed between these two terms, so as to realize:

$$\Psi = \Omega_1^* \cdot \Omega_2 = e^{-j(\Delta\omega)(t+\tau 1) - (\theta 11 - \theta 10)} \cdot e^{j(\Delta\omega)(t+\tau 2) + (\theta 21 - \theta 20)}$$
$$= e^{j(\Delta\omega)(\tau 2 - \tau 1) + (\theta 21 - \theta 11 + \theta 10)}$$

In this equation, the residual phase terms $\Theta_{21} - \Theta_{20} - \Theta_{11} - \Theta_{10}$, that arose in the course of generating the individual tones at the beacons are readily calibrated out. An error term is generated and used to modify the complex conjugate product as:

$$\Psi' = E^* \cdot \Psi = e^{-j(\theta 21 - \theta 20 - \theta 11 + \theta 10)} \cdot e^{j(\Delta\omega)(\tau 1 - \tau 1) + (\theta 21 - \theta 20 - \theta 11 + \theta 10)} = e^{j(\Delta\omega)(\tau 2 - \tau 1)}$$

Next, the phase argument $\phi=(\Delta\omega)(\tau_2-\tau_1)$ is extracted and the solution for the time difference is realized as:

$$\Delta\tau = \tau_2 - \tau_1 = -\frac{\phi}{\Delta\omega}$$

This equation reveals that the key frequency parameter is the frequency difference $\Delta\omega$ rather than the two frequencies themselves. This implies that the operating frequency is not important—only the frequency difference between the two tones. It may be noted that the frequency difference $\Delta\omega$ may be made arbitrarily as small or as large as desired. Making the frequency difference $\Delta\omega$ small serves to avoid phase ambiguity (phase exceeding 180 degrees) over a long distance. For a frequency difference $\Delta\omega$ of 1 KHz there will be no phase ambiguity for a distance up to a 150 km. Further, making the frequency difference $\Delta\omega$ large improves the sensitivity of the phase detection and hence improves performance at a low signal-to-noise ratio (SNR). For example, for a frequency difference $\Delta\omega$ of 1 MHz, a distance of 100 meters results in 120 degrees of phase shift (as opposed to 0.12 degrees of phase difference for a frequency difference $\Delta\omega$ of 1 KHz over the same distance).

Determining the optimal value of $\Delta\omega$ is not trivial, since a large value has significant implications for hardware implementation (i.e. the hardware starts to become relatively wideband which makes its implementation more difficult along with an increased chance of interference overload). For a relatively small value of $\Delta\omega$, building-induced phase shifts basically affect both tones equally and can be canceled out, it being assumed that the two signals have arrived via different paths. Namely, this technique is less susceptible to building construction-induced phase shifts—resulting in better ranging accuracy (again assuming that the frequency difference $\Delta\omega$ is not excessive).

A relatively simple calibration techniques involves generating dual beacon tones via DSB-SC modulation (double sideband, suppressed carrier modulation), by three spaced apart beacon transmitters as a non-limiting example. The number three is the most economical, as it achieves geolocation of the mobile receiver with the fewest number of beacon sites which produce the intersection of a pair of locus point hyperbolas as the geolocation of the mobile receiver, although one or more additional beacons may be used for back-up redundancy. In this three beacon site arrangement, the beacons are generated from a common signal source with equal length sections of transmission line or different lengths of coax with phase shift compensation inserted where necessary, fed to a set of three respective mixers. Alternatively, the common signal source may be wirelessly linked with the modulation sites. At the mixers, the DSB-SC modulation signal may be mathematically represented as the product of a modulating signal m(t) times an RF tone signal as:

$$S(t)=m(t)*\cos(\omega_o t+\theta)$$

The hardware implementation of each multiplication unit may be realized via a commercially available double balanced mixer circuit. For the present application, the modulation is a low frequency tone (much lower than the RF tone). Mathematically this may be represented as:

$$S_1(t)=2*\cos(\omega_A t+\theta_A)*\cos(\omega_1 t+\theta_1)=\cos([\omega_1-\omega_A]t+\theta_1-\theta_A)+\cos([\omega_1+\omega_A]t+\theta_1+\theta_A)$$

This may also be expressed in vector notation as:

$$S_1(t)=e^{j([\omega_1-\omega_A]t+\theta_1-\theta_A)}+e^{j([\omega_1+\omega_A]t+\theta_1+\theta_A)}$$

it being understood that only the real part of the expression for $S_1(t)$ is employed.

Respective second and third beacon signals $S_2(t)$ and $S_3(t)$ may be generated in the same manner using the same low frequency tone, so as to realize the signals:

$$S_2(t)=e^{j([\omega_2-\omega_A]t+\theta_2-\theta_A)}+e^{j([\omega_2+\omega_A]t+\theta_2+\theta_A)}$$

$$S_3(t)=e^{j([\omega_3-\omega_A]t+\theta_3-\theta_A)}+e^{j([\omega_3+\omega_A]t+\theta_3+\theta_A)}$$

Delaying these signals via the channel and processing them at the receiver in the manner described above (i.e., product of upper sideband and conjugated lower sideband) produces the following signals $\omega_1(t)$, $\omega_2(t)$ and $\omega_3(t)$, respectively, as:

$$\Omega_1(t)=e^{j2(\omega_A t+\omega_A\tau_1+\theta_A)}$$

$$\Omega_2(t)=e^{j2(\omega_A t+\omega_A\tau_2+\theta_A)}$$

$$\Omega_3(t)=e^{j2(\omega_A t+\omega_A\tau_3+\theta_A)}$$

Comparing these results with the previous expressions for the conjugated product reveals that calibration has been greatly simplified. Specifically, the following expressions are obtained:

$$\Delta\omega=\omega_A$$

$$\theta_{11}-\theta_{10}=\theta_A$$

$$\theta_{21}-\theta_{20}=\theta_A$$

$$\theta_{31}-\theta_{30}=\theta_A$$

From these expressions it can be readily determined that the phase error compensation parameter E becomes equal to a trivial value of 1.0. This technique of generating the beacons and realizing phase compensation is very practical, as phase errors can be readily calibrated out. To reiterate, the origin of the phase error term is the random starting phases of the various RF generating oscillators. To maintain system stability, the error term cannot be allowed to change during the operation of the network (this error term is passed to and stored at all the mobile receivers and is used thereafter for calibration). This implies that such terms must be phase-locked during system operation. This can be done by either passing a common reference signal to all the beacons for use with their frequency synthesis circuits, or selecting one of the transmitted RF tones as a frequency reference.

It may also be noted that the phase of any signal processing oscillators within the mobile receiver (such as a frequency translation to an IF frequency) cancels out in the course of generating the beat note as long as the same oscillator is used to process both RF tones. From a practical standpoint, it is necessary to phase-lock the receiver oscillator to a system clock, depending upon the accuracy of the receiver frequency reference used in the receiver and also upon the receiver integration time. For example, if use is made of 1 ppm oscillators, then the frequencies will be off by about 1 Hz. Over the duration of a typical integration period (about 50 ms) the phase of the receiver oscillator will drift by about 18 degrees. This is not acceptable when one considers that for a frequency difference $\Delta\omega$ of 1 KHz, 18 degrees is about 15 km of distance. It can be calculated that 1 meter accuracy with a frequency difference $\Delta\omega$ of 1 KHz will require a drift of less than 0.0012 degrees. This also gives an indication of the required phase noise performance of the frequency references.

In lieu of phase locking, a frequency discriminator using overlapping FFTs, to measure the frequency offset may be employed, after which DSP frequency shift techniques can be used to adjust out the residual frequency error. This is considered to be the most practical approach and places the signal processing burden in digital signal processing equipment (which is preferred).

An alternative method for achieving phase calibration involves only the beacons. Implied in this technique is the need for each beacon reference to incorporate a receiver similar to that used by the mobile receiver. In order to compensate for phase skew, the time delay (i.e. distance) between the beacons must be measured. Given the separation distance between respective pairs of transmitters, it is a straightforward matter of calculating the delay and compensating the signals as will be described in the detailed description. Once all the beacons have been phase-compensated, the appropriate error term is selected depending upon which pair of beacons is being accessed.

One technique for determining the location of the mobile receiver is to use time difference of arrival localization by means of three transmitters transmitting respective beacons $S_1$, $S_2$ and $S_3$ relative to a mobile receiver, with each beacon comprising a pair of RF tones on different frequency pairs, as described above. At the mobile transceiver (for which locatization information is desired), all three signal pairs are received and, subsequent to executing the signal processing described above, the time of arrival 'differences' $(\tau_3-\tau_1)$, $(\tau_2-\tau_1)$, and $(\tau_3-\tau_2)$ are determined. The conversion from time difference to distance difference depends upon the propagation velocity. Assuming that the propagation velocity of the respective beacons is at the speed of light 'c' the following distance differential expressions may be derived:

$$\Delta D_1 = (\tau_3-\tau_1)*c$$

$$\Delta D_2 = (\tau_2-\tau_i)*c$$

$$\Delta D_3 = (\tau_3-\tau_2)*c$$

Based upon these distance differentials, the location of the mobile receiver becomes the solution to the classical differential distance geometry. What results is a hyperbola of locus points somewhere along which the mobile receiver is located. A localization based upon a two-dimensional phase difference using three beacons may be generated to realize the two hyperbolas whose interaction is the geolocation of the mobile receiver.

As a further feature of the invention, two tones from just one beacon can be used to ascertain the phase difference of arrival, and then convert phase to time, in order to use a TOA—time of arrival—location algorithm. This modification requires a slightly different signal processing approach which is most readily enabled by the use of Fast Fourier Transform processing techniques.

As in the above example, this scheme employs a two tone signal $S_1$ defined as:

$$S_1 = e^{j\omega 10 t + \theta 10} + e^{j\omega 11 t + \theta 11}$$

After undergoing a propagation delay, the signal $S'_1$ arriving at the mobile receiver is:

$$S_1' = e^{j\omega 10(t+\tau 1)+\theta 10} + e^{j\omega 11(t+\tau 1)+\theta 11}$$

Each tone is separately demodulated using the following demodulation signals $D_{10}$ and $D_{11}$:

$$D_{10} = e^{-j\omega'10 t}$$

$$D_{11} = e^{-j\omega'11 t}$$

This demodulation is most readily accomplished by a FFT transform but other well known techniques may be used. Proceeding with the demodulation the following demodulation signals are obtained:

$$\Omega_{10} = e^{-j\omega'10 t} \sim e^{j\omega 10(t+\tau 1)+\theta 10} = e^{j(\omega 10-\omega'10)t+\omega 10\tau 1+\theta 10}$$

$$\Omega_{11} = e^{-j\omega'11 t} \sim e^{j\omega 11(t+\tau 1)+\theta 11} = e^{j(\omega 11-\omega'11)t+\omega 11\tau 1+\theta 11}$$

A frequency error term $\omega_E$ is defined that is constrained as follows:

$$\omega_E = (\omega_{10}-\omega'_{10}) = (\omega_{11}-\omega'_{11})$$

Ideally, this team should be zero; however, in the event it is not zero, the frequency error should be the same for each frequency. This would be the case for FFT processing. The above expressions may now be rewritten as:

$$\Omega_{10} = e^{j\omega_E t+\omega 10\tau 1+\theta 10}$$

$$\Omega_{11} = e^{j\omega_E t+\omega 11 r 1+\theta 11}$$

One of the above terms is then conjugated and multiplied by the other term to realize an equation for the term $\Gamma$ as:

$$\Gamma = e^{-j\omega_E t-\omega 10\tau 1-\theta 10} e^{j\omega_E t+\omega 11\tau 1+\theta 11} = e^{j(\omega 11-\omega 10)\tau 1+(\theta 11-\theta 10)}$$

Next, a frequency difference term $\Delta\omega$ is defined as:

$$\Delta\omega = \omega_{11}-\omega_{10}$$

and the above equation is rewritten as:

$$\Gamma = e^{j\Delta\omega\tau 1+(\theta 11-\theta 10)}$$

Next, the error term, which must be calibrated out, is defined as:

$$E = e^{j(\theta 11-\theta 10)}$$

and the calibrated signal $\Gamma'$ now becomes:

$$\Gamma' = E^* \sim e^{j\Delta\omega 96 1+(\theta 11-\theta 10)} = e^{j\Delta\omega\tau 1}$$

Next, the phase argument $\phi = (\Delta\omega)\tau_1$ is extracted and the expression is defined for the time difference:

$$\tau_1 = -\frac{\phi}{\Delta\omega}$$

Thus, the time of arrival has been determined, as desired.

Localization (i.e. determining the location of the mobile receiver) may be determined by establishing multiple (three) beacon sites. The above technique is employed to determine the time-of-arrival from each of three beacon sites to the mobile receiver, so as to produce three respective times of arrival $\tau_1$, $\tau_2$ and $\tau_3$. Given these respective time-of-arrival parameters and knowing the locations of the beacon sites, which are fixed, the location of the mobile receiver may be readily determined by solving for the intersection of the time-of-arrival circles. The respective distances $d_1$, $d_2$, $d_3$ to the mobile receiver from the centers of the circles where the beacons are located may be expressed as follows:

$$d_1=((x_{A1}-x_M)^2+(y_{A1}-y_M)^2)^{1/2}$$

$$d_2=((x_{A2}-x_M)^2+(y_{A2}-y_M)^2)^{1/2}$$

$$d_3=((x_{A3}-x_M)^2+(y_{A3}-y_M)^2)^{1/2}$$

The manner in which the processing delay phase shifts are taken into account for each of the time difference of arrival (TDOA) and time of arrival (TOA) schemes described above will now be described. As pointed out above, the signals $S_1$ and $S_2$ transmitted by a pair of beacons are:

$$S_1=e^{j\omega_{10}t+\theta_{10}}+e^{j\omega_{11}t+\theta_{11}}$$

$$S_2=e^{j\omega_{20}t+\theta_{20}}+e^{j\omega_{21}t+\theta_{21}}$$

The signals received at the mobile receiver RX are set forth as:

$$S_1'=e^{j\omega_{10}(t+\tau_1+\tau_r)+\theta_{10}}+e^{j\omega_{11}(t+\tau_1+\tau_r)+\theta_{11}}$$

$$S_2'=e^{j\omega_{20}(t+\tau_2+\tau_r)+\theta_{20}}+e^{j\omega_{21}(t+\tau_2+\tau_r)+\theta_{21}}$$

where $\tau_r$ is the receiver processing delay.

The second term on the right hand side is multiplied by the complex conjugate of the first term on the right hand side. As pointed out above, this can be accomplished in one of two ways: either multiply $S_1'$ and $S_2'$ by its own complex conjugate and then low pass filter, or filter out the $\omega_{10}$ signal from the $\omega_{11}$ signal and then conjugate and multiply. Since, as described above, the latter method is amicable to FFT processing, it is the preferred approach. Working with the components of $S_1$ and $S_2$, expressions for $\Omega_1$ and $\Omega_2$ are derived as:

$$\Omega_1=e^{-j\omega_{10}(t+\tau_1+\tau_r)-\theta_{10}} \cdot e^{j\omega_{11}(t+\tau_1+\tau_r)+\theta_{11}}=e^{j(\omega_{11}-\omega_{10})(t+\tau_1+\tau_r)+(\theta_{11}-\theta_{10})}$$

$$\Omega_2=e^{-j\omega_{20}(t+\tau_2+\tau_r)-\theta_{20}} \cdot e^{j\omega_{21}(t+\tau_2+\tau_r)+\theta_{21}}=e^{j(\omega_{21}-\omega_{20})(t+\tau_2+\tau_r)+(\theta_{21}-\theta_{20})}$$

These are beat note frequencies that are dependent on the frequency difference between the two transmitted tones, and the system is configured so that the beat note is the same frequency for both $\Omega_1$ and $\Omega_2$. Namely, $\Delta\omega$ is defined as:

$$\Delta\omega=\omega_{11}-\omega_{10}=\omega_{21}-\omega_{20}$$

The above expressions can now be rewritten as:

$$\Omega_1=e^{j(\Delta\omega)(t+\tau_1+\tau_r)+(\theta_{11}-\theta_{10})}$$

$$\Omega_2=e^{j(\Delta\omega)(t+\tau_2+\tau_r)+(\theta_{21}-\theta_{20})}$$

Next, a complex conjugate multiplication is formed between these two terms, so as to realize:

$$\Psi=\Omega_1^* \cdot \Omega_2=e^{-j(\Delta\omega)(t+\tau_1+\tau_r)-(\theta_{11}-\theta_{10})} \cdot e^{j(\Delta\omega)(t+\tau_2+\tau_r)+(\theta_{21}-\theta_{20})}=e^{j(\Delta\omega)(\tau_2-\tau_1)+(\theta_{21}-\theta_{20}-\theta_{11}+\theta_{10})}$$

This latter expression reveals that the receiver processing time delay terms cancel each other out.

It is next necessary to calibrate out the phase terms $\Theta_{21}-\Theta_{20}-\Theta_{11}-\Theta_{10}$ which, as pointed out above, are residual phase terms that are introduced by the generation of the individual tones at the beacon sites. As pointed out above, these terms are readily calibrated out by using known values of $\tau_1$ and $\tau_2$. A relatively convenient techniques is to physically place the mobile receiver at an a priori point that is exactly halfway between the two beacon sites so that $\tau_1=\tau_2$. This makes the calibration error term E defined as:

$$E=e^{j(\theta_{21}-\theta_{20}-\theta_{11}+\theta_{10})}$$

Determining the error term is straightforward, and once it has been generated, the value of $\Psi$ is modified as:

$$\Psi'=E^* \cdot \Psi=e^{-j(\theta_{21}-\theta_{20}-\theta_{11}+\theta_{10})} \cdot e^{j(\Delta\omega)(\tau_2-\tau_1)+(\theta_{21}-\theta_{20}-\theta_{11}+\theta_{10})}=e^{j(\Delta\omega)(\tau_2-\tau_1)}$$

Next, the phase argument $\phi=(\Delta\omega)(\tau_2-\tau_1)$ is extracted and, as described above, the solution for the time difference is again realized as:

$$\Delta\tau=\tau_2-\tau_1=-\frac{\phi}{\Delta\omega}$$

For time of arrival processing, the signal $S_1$ is again repeated as:

$$S_1=e^{j\omega_{10}t+\theta_{10}}+e^{j\omega_{11}t+\theta_{11}}$$

After undergoing a propagation delay, the signal $S_1'$ arriving at the receiver is defined a:

$$S_1'=e^{j\omega_{10}(t+\tau_1+\tau_r)+\theta_{10}}+e^{j\omega_{11}(t+\tau_1+\tau_r)+\theta_{11}}$$

where $\tau_r$ is the receiver processing delay.

Next, each tone is separately demodulated using the demodulation signals $D_{10}$ and $D_{11}$:

$$D_{10}=e^{-j\omega'_{10}t}$$

$$D_{11}=e^{-j\omega'_{11}t}$$

As pointed out above, this demodulation is most readily accomplished by using a Fast Fourier Transform processor, although other techniques may be alternatively employed. Proceeding with the modulation, the following demodulation signals $\Omega_{10}$ and $\Omega_{11}$ are obtained.

$$\Omega_{10}=e^{-j\omega'_{10}t} \cdot e^{j\omega_{10}(t+\tau_1+\tau_r)+\theta_{10}}=e^{j(\omega_{10}-\omega'_{10})t+\omega_{10}(\tau_1+\tau_r)+\theta_{10}}$$

$$\Omega_{11}=e^{-j\omega'_{11}t} \cdot e^{j\omega_{11}(t+\tau_1+\tau_r)+\theta_{11}}=e^{j(\omega_{11}-\omega'_{11})t+\omega_{11}(\tau_1+\tau_r)+\theta_{11}}$$

A frequency error term that is constrained is produced as:

$$\omega_D=(\omega_{10}-\omega'_{10})=(\omega_{11}-\omega'_{11})$$

As noted above, ideally, this term should be zero but in the event it is not zero the frequency error should be the same for each frequency. This would be the case for FFT processing. The above expressions can now be rewritten as:

$$\Omega_{10}=e^{j\omega_E t+\omega_{10}(\tau_1+\tau_r)+\theta_{10}}$$

$$\Omega_{11}=e^{j\omega_E t+\omega_{11}(\tau_1+\tau_r)+\theta_{11}}$$

One of the above terms is conjugated and multiplied by the other term to realize the expression for $\Gamma$ as:

$$\Gamma=e^{-j\omega_E t-\omega_{10}(\tau_1+\tau_r)-\theta_{10}} \cdot e^{j\omega_E t+\omega_{11}(\tau_1+\tau_r)+\theta_{11}}=e^{j(\omega_{11}-\omega_{10})(\tau_1+\tau_r)+(\theta_{11}-\theta_{10})}$$

As defined above a frequency difference term $\Delta\omega$ is again set forth as:

$$\Delta\omega=\omega_{11}-\omega_{10}$$

so that the above expression may be rewritten as:

$$\Gamma=e^{j\Delta\omega(\tau_1+\tau_r)+(\theta_{11}-\theta_{10})}=e^{j\Delta\omega\tau_1+(\Delta\omega \cdot \tau_r+\theta_{11}-\theta_{10})}$$

The error term E, which must be calibrated out, is defined as:

$$E=e^{j(\Delta\omega \cdot \tau_r+\theta_{11}-\theta_{10})}$$

so that the calibrated signal $\Gamma'$ becomes $$\Gamma'=E^* \cdot e^{j\Delta\omega\tau_1+(\Delta\omega \cdot \tau_r+\theta_{11}-\theta_{10})}=e^{j\Delta\omega\tau_1}$$

The phase argument $\phi=(\Delta\omega)\tau_1$ is then extracted and the time difference is solved thereby extracting the time of arrival as intended as:

$$\tau_1 = -\frac{\phi}{\Delta\omega}$$

It may be noticed that since the processing delay does not naturally cancel itself out in the course of receiver signal processing, it must be calibrated out by a separate processing step in the receiver.

DETAILED DESCRIPTION

Figure 1:
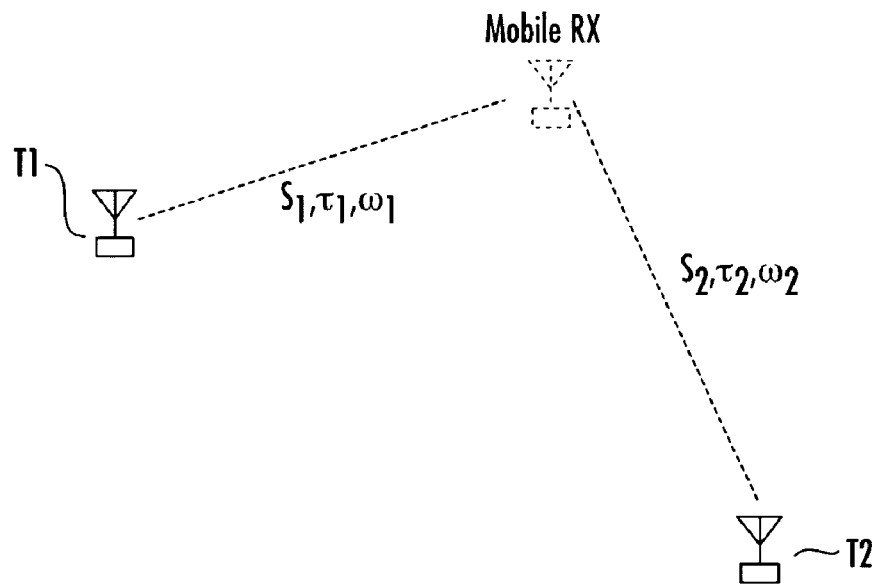
FIG. 1 diagrammatically illustrates an arbitrary pair of fixed transmitters that are spaced apart from one another and from a mobile receiver, the location of which is to be determined.

Before detailing the architecture and methodology of the multi-frequency beacon-based object location system in accordance with the present invention, it should be observed that the invention resides primarily in a prescribed novel arrangement of conventional communication circuits and components, and supervisory control software therefor that employs the phase and time difference algorithms of the invention. Consequently, the configurations of such circuits and components and the manner in which they may be distributed relative to an object whose location is to be determined have, for the most part, been shown in the drawings by readily understandable block diagrams, which show only those specific aspects that are pertinent to the present invention, so as not to obscure the disclosure with details which will be readily apparent to those skilled in the art having the benefit of the description herein. Thus, the system/network and subsystem (e.g., beacon transmitter) block diagrams are primarily intended to show the major components of various embodiments of the invention in convenient functional groupings, whereby the present invention may be more readily understood.

In order to facilitate an understanding of the underlying communication mechanism employed by the present invention to locate an object relative to a set of at least three multi-frequency beacon transmitter sites, it is initially useful to consider the operation and functionality of an arbitrary pair of transmitters relative to a receiver whose geographical location relative to the two transmitters is to be determined. To this end, attention is directed to FIG. 1, which diagrammatically illustrates an arbitrary pair of fixed transmitters T1 and T2, that are spaced apart from one another and from a mobile receiver RX, the location of which is to be determined. Transmitter T1 transmits a pair of fixed RF tones F10 and F11, while transmitter T2 transmits a different pair of frequencies F20 and F21. In the discussion to follow, the manner in which the time difference of arrival between these pairs of beacons are derived will be explained; namely, how to ascertain $t_2-t_1$ will be described. This will then be extended to the general case of multiple beacons as would be used for localization based upon a time difference of arrival (TDOA) algorithm, as well as a time of arrival (TOA) algorithm.

The beacon signals transmitted by the respective transmitters T1 and T2 are the signals $S_1$ and $S_2$, which are defined in equations (1) and (2) as:

$$S_1 = e^{j\omega_{10}t+\theta_{10}} + e^{j\omega_{11}t+\theta_{11}} \qquad (1)$$

$$S_2 = e^{j\omega_{20}t+\theta_{20}} + e^{j\omega_{21}t+\theta_{21}} \qquad (2)$$

The transmitted signal pairs transmitted by each beacon site are such that the difference between the frequencies of each pair is the same. Thus, for example, one beacon site may transmit the frequency pair 1.0 MHz and 1.1 MHz, while another beacon site may transmit the frequency pair 1.2 MHz and 1.3 MHz, providing a common frequency difference of 100 KHz, as a non-limiting example.

The signals received at the mobile receiver (RX) are therefore the signals set forth in equations (3) and (4) as:

$$S_1' = e^{j\omega_{10}(t+\tau_1)+\theta_{10}} + e^{j\omega_{11}(t+\tau_1)+\theta_{11}} \qquad (3)$$

$$S_2' = e^{j\omega_{20}(t+\tau_2)+\theta_{20}} + e^{j\omega_{21}(t+\tau_2)+\theta_{21}} \qquad (4)$$

In this set of equations, it is desired to multiply the second term on the right hand side by the complex conjugate of the first term on the right hand side. This can be cone one of two ways. First, either multiply $S'_1$ and $S'_2$ by its own complex conjugate and then low pass filter the product, or alternatively, filter out $\omega_{10}$ signal from the $\omega_{11}$ signal and then conjugate and multiply. The latter method is readily accomplished by FFT processing in the digital signal processing domain and it is therefore the preferred approach.

Working with the components of signals $S_1$ and $S_2$, the following signal representative equations (5) and (6) may be respectively defined:

$$\Omega_1 = e^{-j\omega_{10}(t+\tau_1)-\theta_{10}} \cdot e^{j\omega_{11}(t+\tau_1)+\theta_{11}} = e^{j(\omega_{11}-\omega_{10})(t+\tau_1)+(\theta_{11}-\theta_{10})} \qquad (5)$$

$$\Omega_2 = e^{-j\omega_{20}(t+\tau_2)-\theta_{20}} \cdot e^{j\omega_{21}(t+\tau_2)+\theta_{21}} = e^{j(\omega_{21}-\omega_{20})(t+\tau_2)+(\theta_{21}-\theta_{20})} \qquad (6)$$

These signals are beat note frequencies that are dependent on the frequency differences between the two transmitted tones. As pointed out above, pursuant to the invention, the system is configured so that the beat note is the same frequency for $\Omega_1$ and $\Omega_2$; that is, the difference between each pair of tones is defined in equation (7) as:

$$\Delta\omega = \omega_{11} - \omega_{10} = \omega_{21} - \omega_{20} \tag{7}$$

Equation (5) and (6) may be respectively rewritten as equations (8) and (9) as follows:

$$\Omega_1 = e^{j(\Delta\omega)(t+\tau_1)+(\theta_{11}-\theta_{10})} \tag{8}$$

$$\Omega_2 = e^{j(\Delta\omega)(t+\tau_2)+(\theta_{21}-\theta_{20})} \tag{9}$$

Next, a complex conjugate multiple is performed between these two terms, so as to realize equation (10) as:

$$\Psi = \Omega_1^* \sim \Omega_2 = e^{-j(\Delta\omega)(t+\tau_1)-(\theta_{11}-\theta_{10})} \sim e^{j(\Delta\omega)(t+\tau_2)+(\theta_{21}-\theta_{20})}$$
$$= e^{j(\Delta\omega)(\tau_2-\tau_1)+(\theta_{21}\theta_{20}-\theta_{11}+\theta_{10})} \tag{10}$$

In equation (10), it is necessary to calibrate out the phase terms $\Theta_{21} - \Theta_{20} - \Theta_{11} - \Theta_{10}$, as these terms are residual phase terms that arose in the course of generating the individual tones at the beacons. These terms are actually a nuisance, but fortunately can be readily calibrated out. A convenient and practical technique for calibrating out these terms will be described below. The calibrate error term E is given in equation (11) as:

$$E = e^{j(\theta_{21}-\theta_{20}-\theta_{11}+\theta_{10})} \tag{11}$$

There are numerous ways to generate the error term, but once it has been obtained, equation (10) is modified to realize equation (12) as follows:

$$\Psi' = E^* \sim \Psi = e^{-j(\theta_{21}-\theta_{20}-\theta_{11}+\theta_{10})} \sim e^{j(\Delta\omega)(\tau_2-\tau_1)+(\theta_{21}-\theta_{20}-\theta_{11}+\theta_{10})} = e^{j(\Delta\omega)(\tau_2-\tau_1)} \tag{12}$$

Next, the phase argument $\phi = (\Delta\omega)(\tau_2 - \tau_1)$ is extracted and the solution for the time difference is realized in equation (13) is:

$$\Delta\tau = \tau_2 - \tau_1 = -\frac{\phi}{\Delta\omega} \tag{13}$$

Equation (13) reveals that the key frequency parameter is the frequency difference $\Delta\omega$ rather than the two frequencies themselves. This has interesting implications inasmuch as the operating frequency is not important, only the frequency difference between the two tones. At this point several observations can be made. First of all, the frequency difference $\Delta\omega$ may be made arbitrarily as small or as large as desired. Making the frequency difference $\Delta\omega$ small serves to avoid phase ambiguity (phase exceeding 180 degrees) over a long distance. For a frequency difference $\Delta\omega$ of 1 KHz there will be no phase ambiguity for a distance up to a 150 km. Further, making the frequency difference $\Delta\omega$ large improves the sensitivity of the phase detection and hence improves performance at a low signal to noise ratio (SNR). For example, for a frequency difference $\Delta\omega$ of 1 MHz, a distance of 100 meters results in 120 degrees of phase shift (as opposed to 0.12 degrees of phase difference for a frequency difference $\Delta\omega$ of 1 KHz over the same distance).

Determining the optimal value of $\Delta\omega$ is not trivial, since a large value has significant implications for hardware implementation (i.e. the hardware starts to become relatively wideband which makes its implementation more difficult along with an increased chance of interference overload). An interesting phenomenon is the fact that for a relatively small value of $\Delta\omega$, building induced phase shifts basically affect both tones equally and can be canceled out. This can be demonstrated by modifying equations (3) and (4), respectively, to realize equations (14) and (15) as follows:

$$S'_1 = e^{j\omega_{10}(t+\tau_1)+\theta_{10}+\beta_1} + e^{j\omega_{11}(t+\tau_1)+\theta_{11}+\beta_1} \tag{14}$$

$$S'_2 = e^{j\omega_{20}(t+\tau_2)+\theta_{20}+\beta_2} + e^{j\omega_{21}(t+\tau_2)+\theta_{21}+\beta_2} \tag{15}$$

where $\beta_1$ and $\beta_2$ represent, environment (e.g., building)-induced phase shifts.

It should be noted that it has been assumed that the two signals have arrived via different paths. Equations (14) and (15) are now processed as equations (3) and (4) to form the conjugate products in equations (16) and (17) as:

$$\omega_1 = e^{-j\omega_{10}(t+\tau_1)-\theta_{10}-\beta_1} \sim e^{j\omega_{11}(t+\tau_1)+\theta_{11}+\beta_1} = e^{j(\omega_{11}-\omega_{10})(t+\tau_1)+(\theta_{11}-\theta_{10})} \tag{16}$$

$$\Omega_2 = e^{-j\omega_{20}(t+\tau_2)-\theta_{20}-\beta_2} \sim e^{j\omega_{21}(t+\tau_2)+\theta_{21}+\beta_2} = e^{j(\omega_{21}-\omega_{20})(t+\tau_2)+(\theta_{21}-\theta_{20})} \tag{17}$$

It may be noticed that the building-induced phase terms $\beta_1$ and $\beta_2$ cancel out. An objective here is that this technique is less susceptible to building construction-induced phase shifts—resulting in better ranging accuracy (again assuming that the frequency difference $\Delta\omega$ is not excessive).

Figure 2:
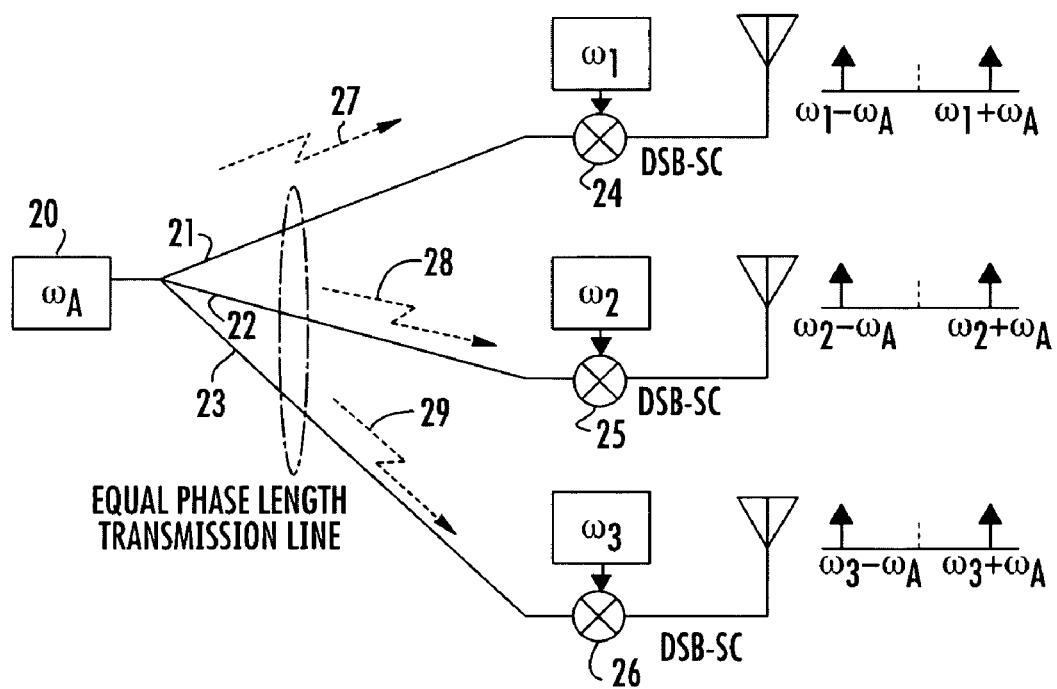
FIG. 2 diagrammatically illustrates a set of three beacon generators referenced to a common signal generator.

A relatively simple calibration technique that involves generating dual beacon tones is to employ DSB-SC modulation (double sideband, suppressed carrier modulation). The use of this technique by three spaced apart beacon transmitters as a non-limiting example, such as those shown in FIG. 2, will now be described. In the illustrated implementation, the beacons are generated from a common reference 20, with equal length sections 21, 22 and 23 of transmission line or different lengths of coax with phase shift compensation inserted where necessary, fed to respective mixer units 24, 25 and 26. Alternatively, as represented by broken lines 27, 28 and 29, the common reference may be wirelessly transmitted to the respective mixer units 24, 25 and 26.

At the mixers, the DSB-SC modulation signal may be mathematically represented as the product of a modulating signal times an RF tone signal as set forth in equation (18) as follows:

$$S(t) = m(t) * \cos(\omega_0 t + \theta) \tag{18}$$

In equation (18), m(t) is the modulating signal and $\omega_0$ represents the RF tone. The hardware implementation of each multiplication unit shown in FIG. 2, may be realized via a commercially available double balanced mixer circuit. For the present application, the modulation is a low frequency tone (much lower than the RF tone). Mathematically this is shown as equation (19) as:

$$S_1(t) = 2*\cos(\omega_A t + \theta_A)*\cos(\omega_1 t + \theta_1) = \cos([\omega_1 - \omega_A]t + \theta_1 - \theta_A) + \cos([\omega_1 + \omega_A]t + \theta_1 + \theta_A) \tag{19}$$

This may be expressed in vector notation as shown is equation (20).

$$S_1(t) = e^{j([\omega_1-\omega_A]t+\theta_1-\theta_A)} + e^{j([\omega_1+\omega_A]t+\theta_1+\theta_A)} \tag{20}$$

it being understood that only the real part of the expression for $S_1(t)$ is to be employed.

Respective second and third beacon signals $S_2(t)$ and $S_3(t)$ may be generated in the same manner using the same low frequency tone, so as to realize the expressions (21) and (22) as:

$$S_2(t) = e^{j([\omega_2-\omega_A]t+\theta_2-\theta_A)} + e^{j([\omega_2+\omega_A]t+\theta_2+\theta_A)} \tag{21}$$

$$S_3(t) = e^{j([\omega_2-\omega_A]t+\theta_3-\theta_A)} + e^{j([\omega_3+\omega_A]t+\theta_3+\theta_A)} \tag{22}$$

Delaying these signals via the channel and processing them at the receiver in the manner described above (i.e., product of upper sideband and conjugated lower sideband) produces the following expressions (23), (24) and (25) for $\Omega_1(t)$, $\Omega_2(t)$ and $\Omega_3(t)$, respectively, as:

$$\Omega_1(t) = e^{j2(\omega_A t + \omega_A \tau_1 + \theta_A)} \quad (23)$$

$$\Omega_2(t) = e^{j2(\omega_A t + \omega_A \tau_2 + \theta_A)} \quad (24)$$

$$\Omega_3(t) = e^{j2(\omega_A t + \omega_A \tau_3 + \theta_A)} \quad (25)$$

Comparing these results with the previous expressions for the conjugated product reveals that calibration has been greatly simplified. Specifically, the following expression (26), (27), (28) and (29) are obtained:

$$\Delta\omega = \omega_A \quad (26)$$

$$\theta_{11} - \theta_{10} = \theta_A \quad (27)$$

$$\theta_{21} - \theta_{20} = \theta_A \quad (28)$$

$$\theta_{31} - \theta_{30} = \theta_A \quad (29)$$

From these expressions it can be seen that the phase error compensation parameter E becomes a trivial value of 1.0, as shown in equation (30).

$$E = e^{j(\theta_{21} - \theta_{20} - \theta_{11} + \theta_{10})} = e^{j(\theta_A - \theta_A)} = 1.0 \quad (30)$$

This technique of generating the beacons, and realizing phase compensation, is very practical. As shown by expression (30), phase errors can be readily calibrated out. To reiterate, the origin of the phase error term is the random starting phases of the various RF generating oscillators. Obviously, in order to keep the system stable, the error term cannot be allowed to change during the operation of the network (this error term is passed to and stored at all the mobile receivers and is used thereafter for calibration). This implies that such terms must be phase locked during system operation. This can be done by either passing a common reference signal to all the beacons for use with their frequency synthesis circuits, or selecting one of the transmitted RF tones as a frequency reference.

It may be noted that the phase of any signal processing oscillators within the mobile receiver (such as a frequency translation to an IF frequency) cancels out in the course of generating the beat note as long as the same oscillator is used to process both RF tones. From a practical standpoint, it is necessary to phase lock the receiver oscillator to a system clock depending upon the accuracy of the receiver frequency reference used in the receiver and also upon the receiver integration time. For example, if use is made of 1 ppm oscillators, then the frequencies will be off by about 1 Hz. Over the duration of a typical integration period (about 50 ms) the phase of the receiver oscillator will drift by about 18 degrees. This is not acceptable when one considers that for a frequency difference $\Delta\omega$ of 1 KHz, 18 degrees is about 15 km of distance. It can be calculated that 1 meter accuracy with a frequency difference $\Delta\omega$ of 1 KHz will require a drift of less than 0.0012 degrees. This also gives an indication of the required phase noise performance of the frequency references.

In lieu of phase locking, a frequency discriminator using overlapping FETs to measure the frequency offset may be employed, after which DSP frequency shift techniques can be used to adjust out the residual frequency error. This is considered to be the most practical approach and places the signal processing burden in digital signal processing equipment (which is preferred).

Figure 3:
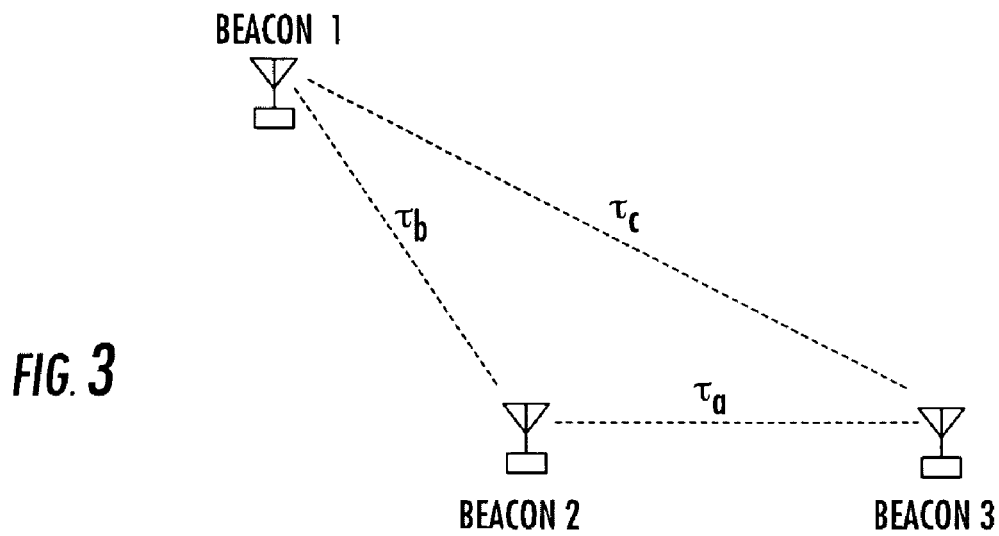
FIG. 3 depicts a method for achieving phase calibration that involves only beacons.

FIG. 3 depicts an alternative method for achieving phase calibration that involves only the beacons. Implied in this technique is the need for each beacon reference to incorporate a receiver similar to that used by the mobile receiver. In order to compensate for phase skew, the time delay (i.e., distance) between the beacons must be measured. There are several conventional techniques for measuring this time delay, among them are UWB, TOA and NFER. The actual method for making this measurement is readily carried out and will not be described herein. Suffice it to say that, given the separation distance between respective pairs of transmitters, it is a straightforward matter of calculating the delay and compensating the signals as described below.

Where beacon transmitter 'beacon 1' is a receiver, the following expressions (31) and (32) may be derived.

$$\Psi_1 = e^{j(\Delta\omega)(\tau_c - \tau_b) + (\theta_{31} - \theta_{30} - \theta_{21} + \theta_{20})} \quad (31)$$

$$E_1 = e^{-j(\Delta\omega)(\tau_c - \tau_b)} \sim \Psi_1 = e^{j(\theta_{31} - \theta_{30} - \theta_{21} + \theta_{20})} \quad (32)$$

Where beacon transmitter 'beacon 2' is a receiver, the following expressions (33) and (34) may be derived.

$$\Psi_2 = e^{j(\Delta\omega)(\tau_b - \tau_a) + (\theta_{11} - \theta_{10} - \theta_{31} + \theta_{30})} \quad (33)$$

$$E_2 = e^{-j(\Delta\omega)(\tau_b - \tau_a)} \sim \Psi_2 = e^{j(\theta_{11} - \theta_{10}\theta_{31} + \theta_{30})} \quad (34)$$

Where beacon transmitter 'beacon 3' is a receiver, the following expressions (35) and (36) may be derived.

$$\Psi_3 = e^{j(\Delta\omega)(\tau_c - \tau_a) + (\theta_{11} - \theta_{10} - \theta_{21} + \theta_{20})} \quad (35)$$

$$E_3 = e^{-j(\Delta\omega)(\tau_c - \tau_a)} \sim \Psi_3 = e^{j(\theta_{11} - \theta_{10} - \theta_{21} + \theta_{20})} \quad (36)$$

At this point all the beacons have been phase compensated. The appropriate error term is selected depending upon which pair of beacons is being accessed.

Figure 4:
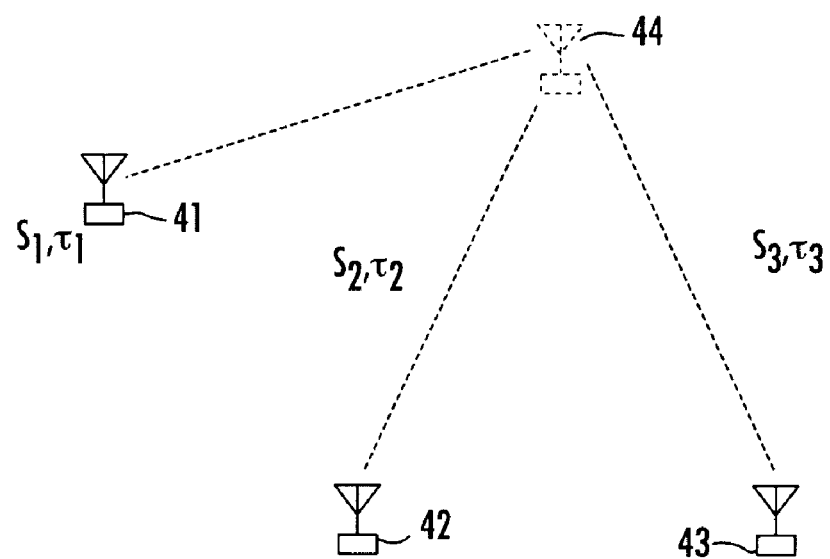
FIG. 4 diagrammatically illustrates a set of three transmitters transmitting respectively different beacons relative to a mobile receiver, each beacon comprising a pair of RF tones on different frequency pairs.

A technique for determining the location of the mobile receiver using time difference of arrival localization will now be described with reference to FIG. 4, which shows three transmitters 41, 42 and 43 transmitting respective beacons $S_1$, $S_2$ and $S_3$ relative to a mobile receiver 44, each beacon comprising a pair of RF tones on difference frequency pairs, as described above. At the mobile transceiver 44 (for which localization information is desired), all three signal pairs are received and, subsequent to executing the signal processing described above, the time of arrival 'differences' $(\tau_3 - \tau_1)$, $(\tau_2 - \tau_1)$, and $(\tau_3 - \tau_2)$ are determined. The conversion from time difference to distance difference depends upon the propagation velocity. Assuming that the propagation velocity of the respective beacons is at the speed of light 'c' the following expressions (37), (38) and (39) are derived:

$$\Delta D_1 = (\tau_3 - \tau_1) * c \quad (37)$$

$$\Delta D_2 = (\tau_2 - \tau_1) * c \quad (38)$$

$$\Delta D_3 = (\tau_3 - \tau_2) * c \quad (39)$$

Figure 5:
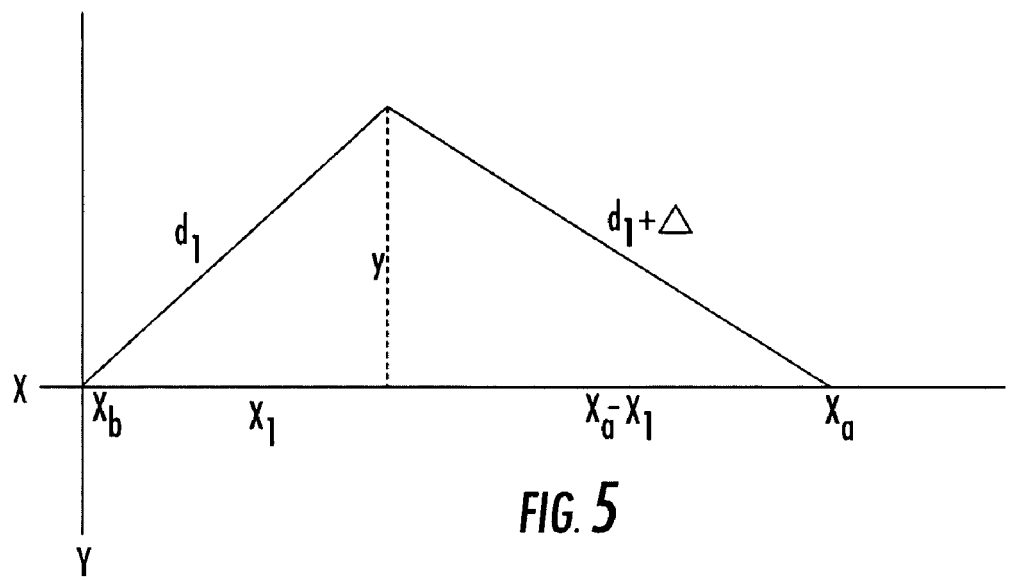
FIG. 5 is a classical differential distance geometry diagram for determining the location of a mobile receiver.

Based upon these distance differentials, the location of the mobile receiver becomes the solution to the classical differential distance problem as diagrammatically illustrated in the triangulation diagram of FIG. 5. It will be assumed that there is a differential distance geometry as shown in FIG. 5, wherein let $X_b$ is at the origin. From FIG. 5, the following relationships (40) and (41) can be established:

$$x_1^2 = y^2 = d_1^2 \quad (40)$$

$$(X_a - x_1)^2 + y^2 = (d_1 + \Delta)^2 \quad (41)$$

Solving for y in both equations and equating the results yields the expression (42) as:

$$X_a^2 - 2\Delta d_{1-\Delta}^2 = 2x_1 X_a \quad (42)$$

Solving for $x_1$ and y yields expression (43) as:

$$x_1 = \frac{X_a^2 - 2\Delta d_1 - \Delta^2}{2X_a} \quad (43)$$

and expression (44) as:

$$y = \sqrt{d_1^2 x_1^2} \quad (44)$$

Figure 6:
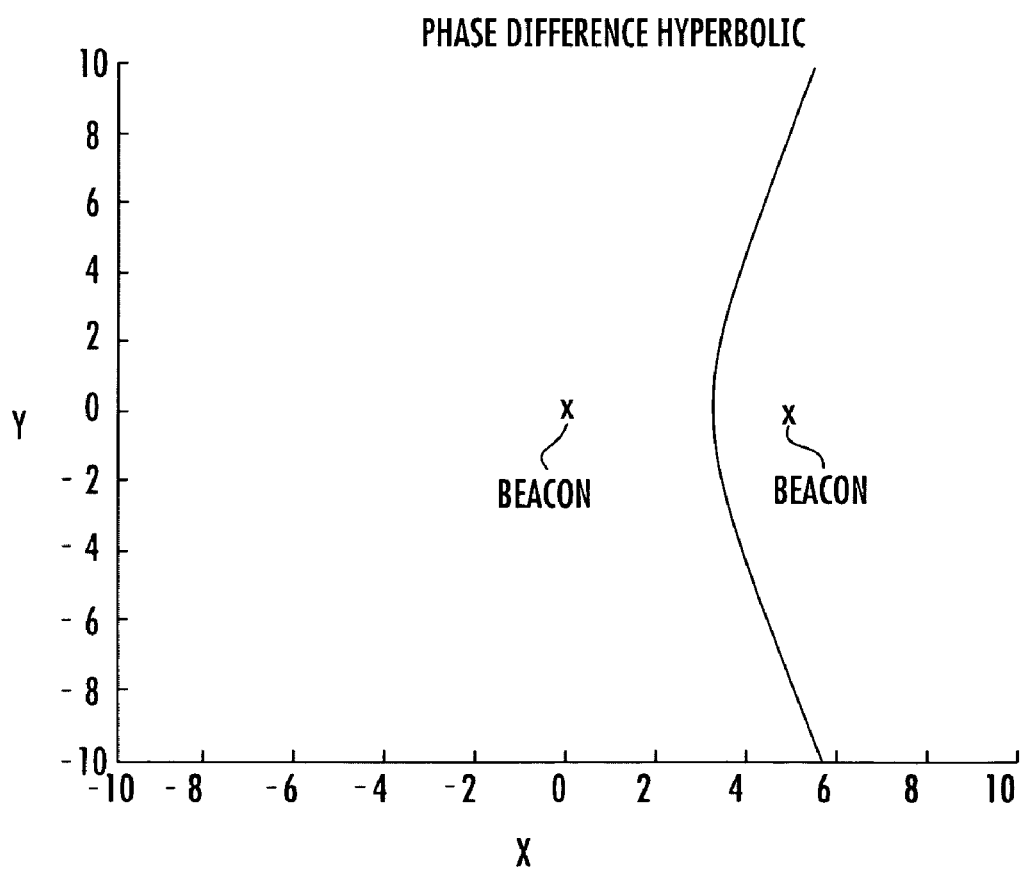
FIG. 6 shows a hyperbola associated with the use of a pair of transmitters to locate a mobile receiver.

It should be observed that $x_1$ and y are functions of $d_1$ and $\Delta$ and define a hyperbola with respect to the points Xa and Xb as shown in FIG. 6, where Xb=0, Xa=5 and $\Delta=-1.5$.

Figure 7:
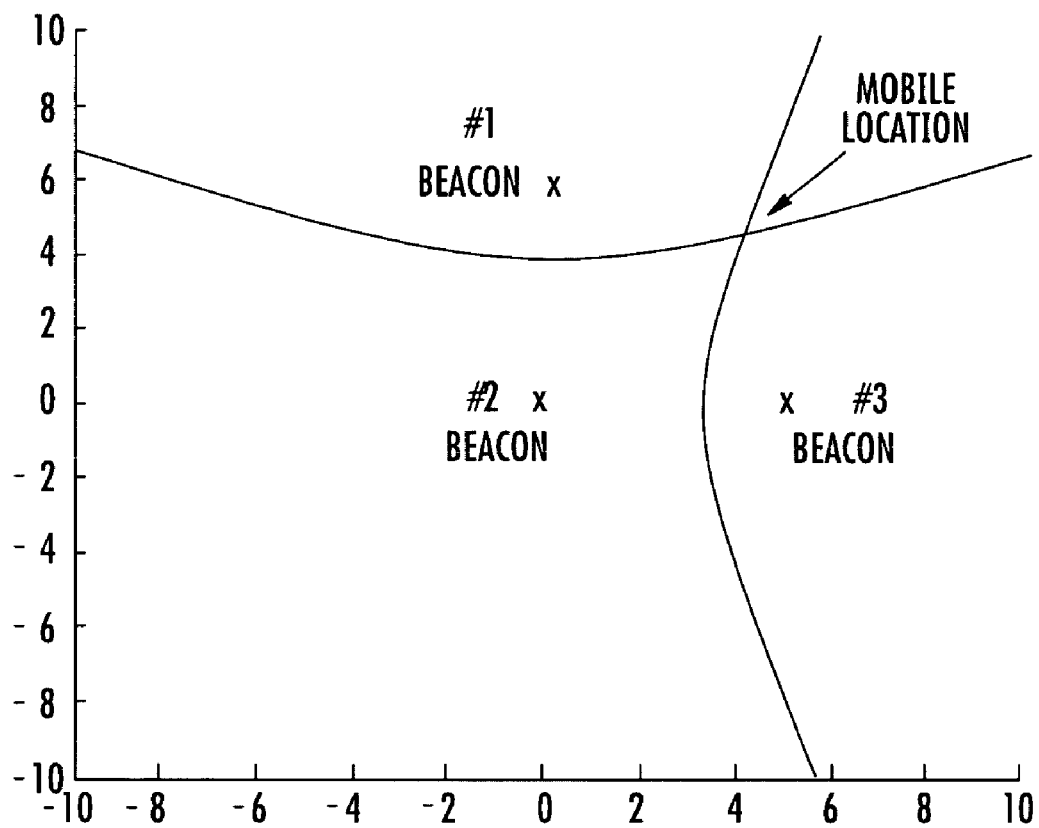
FIG. 7 shows a localization diagram wherein two hyperbolas intersect to locate a mobile receiver based upon a two-dimensional phase difference using three beacons in accordance with the invention.

A localization based upon a two-dimensional phase difference using three beacons may be generated as shown in FIG. 7, From FIG. 7 it can be seen that the location of the mobile unit is the intersection of the two hyperbolas.

Figure 8:
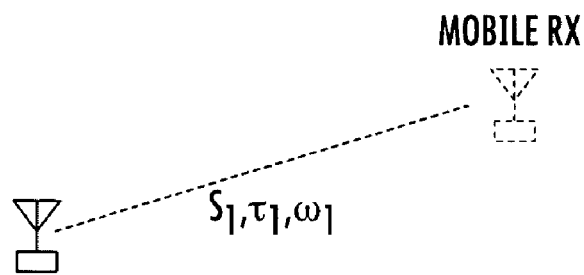
FIG. 8 shows an individual beacon site and a mobile receiver to illustrate time difference of arrival based upon phase difference.
Figure 9:
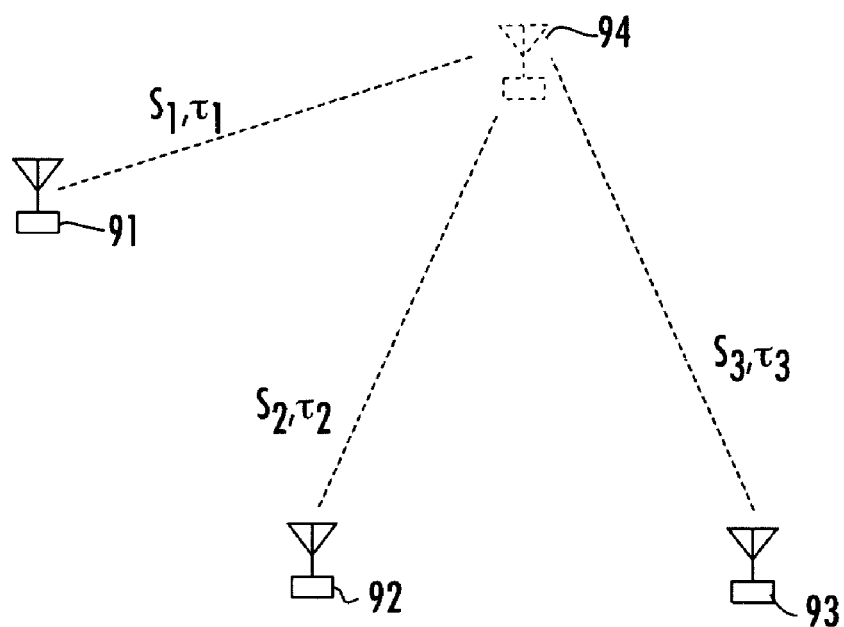
FIG. 9 diagrammatically illustrates an arrangement of three beacon sites to determine the location of a mobile receiver.

The manner in which two tones from just one beacon can be used to ascertain the phase difference of arrival, and then convert phase to time, in order to use a TOA—time of arrival—localization algorithm will now be described with reference to FIGS. 8 and 9. This modification requires a slightly different signal processing approach which is most readily enabled by the use of Fast Fourier Transform processing techniques.

As in the above example, this scheme employs a two tone signal $S_1$ as defined in equation (1) and restated as follows as equation (45).

$$S_1 = e^{j\omega 10 t + \theta 10} + e^{j\omega 11 t + \theta 11} \quad (45)$$

After undergoing a propagation delay, the signal $S'_1$ arriving at the mobile receiver is as set forth in equation (3) above, and restated in equation (46).

$$S'_1 = e^{j\omega 10(t+\tau 1)+\theta 10} + e^{j\omega 11(t+\tau 1)+\theta 11} \quad (46)$$

Each tone is separately demodulated using the demodulation signals $D_{10}$ and $D_{11}$ shown below in equations (47) and (48).

$$D_{10} = e^{-j\omega'10 t} \quad (47)$$

$$D_{11} = e^{-j\omega'11 t} \quad (48)$$

This demodulation is most readily accomplished by a FET transform but other well known techniques may be used. Proceeding with the demodulation the following demodulation signals are obtained as shown in expressions (49) and (50).

$$\omega_{10} = e^{-j\omega'10 t} \sim e^{j\omega 10(t+\tau 1)+\theta 10} = e^{j(\omega 10 \tau 1 + \theta 10)} \quad (49)$$

$$\Omega_{11} = i^{-j\omega'11 t} \sim e^{j\omega 11(t+\tau 1)+\theta 11} = e^{j(\omega 11 - \omega'11)t + \omega 11 \tau_i + \theta 11} \quad (50)$$

A frequency error term $\omega_E$ is defined that is constraint according to the following equation (51):

$$\omega_E = (\omega_{10} - \omega'_{10}) = (\omega_{11} - \omega'_{11}) \quad (51)$$

Ideally, this term should be zero; however, in the event it is not zero, the frequency error should be the same for each frequency. This would be the case for FFT processing. Equations (49) and (50) may now be rewritten as expressions (52) and (53).

$$\Omega_{10} = e^{j\omega_E t + \omega 10 \tau 1 + \theta 10} \quad (52)$$

$$\Omega_{11} = e^{j\omega_E t + \omega 11 \tau 1 + \theta 11} \quad (53)$$

One of the above terms is then conjugated and multiplied by the other term to realize equation (54) for the term $\Gamma$ as:

$$\Gamma = e^{-j\omega_E t - \omega 10 \tau 1 - \theta 10} \sim e^{j\omega_E t + \omega 11 \tau 1 + \theta 11} = e^{j(\omega 11 - \omega 10)\tau 1 + (\theta 11 - \theta 10)} \quad (54)$$

Next, a frequency difference term $\Delta\omega$ is defined in equation (55) as:

$$\Delta\omega = \omega_{11} - \omega_{10} \quad (55)$$

and equation (54) is rewritten in equation (56) as:

$$\Gamma = e^{j\Delta\omega \tau 1 + (\theta 11 - \theta 10)} \quad (56)$$

Next, the error term, which must be calibrated out, is defined in equation (57) as:

$$E = e^{j(\theta 11 - \theta 10)} \quad (57)$$

and the calibrated signal $\Gamma'$ now becomes:

$$\Gamma' = E^* \sim e^{j\Delta\omega \tau 1 + (\theta 11 - \theta 10)} = e^{j\Delta\omega \tau 1} \quad (58)$$

Next, the phase argument $\phi = (\Delta\omega)\tau_1$ is extracted and the following expression (59) is defined for the time difference:

$$\tau_1 = -\frac{\phi}{\Delta\omega} \quad (59)$$

Thus, the time of arrival has been determined, as desired.

Figure 10:
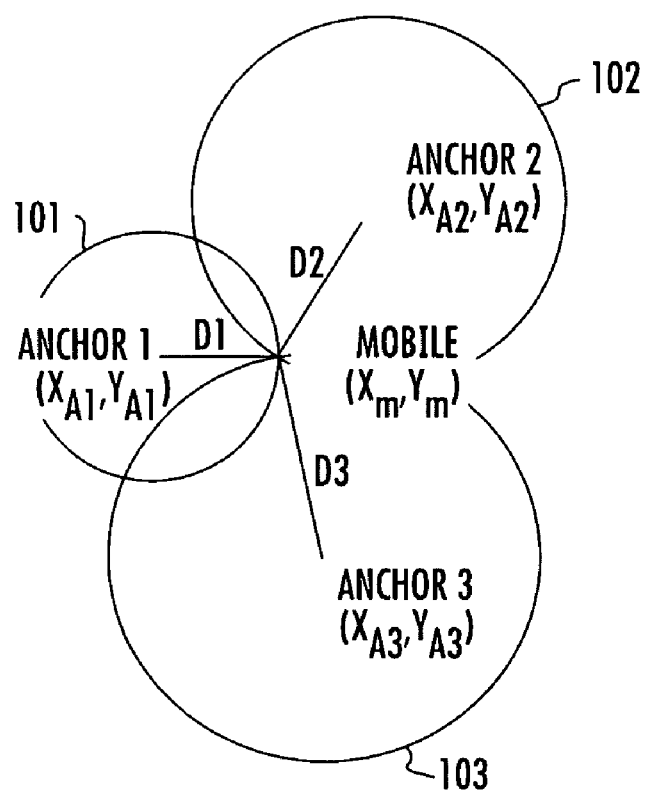
FIG. 10 diagrammatically illustrates a set of three circles associated with respective beacon sites for locating a mobile receiver using respective time-of-arrival parameters and knowing the locations of the beacon sites.

Localization (i.e. determining the location of the mobile receiver) may be determined by established multiple beacon sites, as described above, and diagrammatically illustrated in FIG. 9. In particular, the above technique is employed to determine the time-of-arrival from each of beacon sites 91, 92 and 93 to the mobile receiver 94, so as to produce three respective times of arrival $\tau_1$, $\tau_2$ and $\tau_3$. Given these respective time-of-arrival parameters and knowing the locations of the beacon sites, which are fixed, the location of the mobile receiver may be readily determined by solving for the intersection of the time-of-arrival circles are shown in FIG. 10. The respective distances $d_1$, $d_2$, $d_3$ to the mobile receiver from the centers of the circles 101, 102 and 103 where the beacons are located may be expressed by equations (60), (61) and (62) as follows:

$$d_1 = ((x_{A1} - x_M)^2 + (y_{A1} - y_M)^2)^{1/2} \quad (60)$$

$$d_2 = ((x_{A2} - x_M)^2 + (y_{A2} - y_M)^2)^{1/2} \quad (61)$$

$$d_3 = ((x_{A3} - x_M)^2 + (y_{A3} - y_M)^2)^{1/2} \quad (62)$$

The manner in which the processing delay phase shifts are taken into account for each of the time difference of arrival (TDOA) and time of arrival (TOA) schemes described above will now be described. As pointed out above, and a shown by equations (1) and (2) and restated in equations (63) and (64), the signals $S_1$ and $S_2$ transmitted by a pair of beacons are:

$$S_1 = e^{j\omega 10 t + \theta 10} + e^{j\omega 11 t + \theta 11} \quad (63)$$

$$S_2 = e^{j\omega 20 t + \theta 20} + e^{j\omega 21 t + \theta 21} \quad (64)$$

The signals received at the mobile receiver (RX) are set forth in equations (65) and (66)

$$S'_1 = e^{j\omega 10(t+\tau 1+\tau_r)+\theta 10} + e^{j\omega 11(t+\tau 1+\tau_r)+\theta 11} \quad (65)$$

$$S'_2 = e^{j\omega 20(t+\tau 2+\tau_r)+\theta 20} + e^{j\omega 21(t+\tau 2+\tau_r)+\theta 21} \quad (66)$$

where $\tau_r$ is the receiver processing delay.

The second term on the right hand side is now multiplied by the complex conjugate of the first term on the right hand side. As pointed out above, this can be accomplished in one of two ways: either multiply $S'_1$ and $S'_2$ by tis own complex conjugate and then low pass filter, or filter out the $\omega_{10}$ signal from the $\omega_{11}$ signal and then conjugate and multiply. Since, as described above, the latter method is amicable to FFT processing, it is the preferred approach. Working with the components of $S_1$ and $S_2$, expressions (67) and (68) for $\Omega_1$ and $\Omega_2$ are derived as follows:

$$\Omega_1 = e^{-j\omega_{10}(t+\tau_1+\tau_r)-\theta_{10}} \sim e^{j\omega_{11}(t+\tau_1+\tau_r)+\theta_{11}} = e^{j(\omega_{11}-\omega_{10})(t+\tau_1+\tau_r)+(\theta_{11}-\theta_{10})} \quad (67)$$

$$\Omega_2 = e^{-j\omega_{20}(t+\tau_2+\tau_r)-\theta_{20}} \sim e^{j\omega_{21}(t+\tau_2+\tau_r)+\theta_{21}} = e^{j(\omega_{21}-\omega_{20})(t+\tau_2+\tau_r)+(\theta_{21}-\theta_{20})} \quad (68)$$

As pointed out above, these are beat note frequencies that are dependent on the frequency difference between the two transmitted tones, and the system is configured so that the beat note is the same frequency for both $\Omega_1$ and $\Omega_2$. Namely, as shown in equation (69), $\Delta\omega$ is defined as:

$$\Delta\omega = \omega_{11} - \omega_{10} = \omega_{21} - \omega_{20} \quad (69)$$

Equations (67) and (68) can now be rewritten as respective equations (70) and (71):

$$\Omega_1 = e^{j(\Delta\omega)(t+\tau_1+\tau_r)+(\theta_{11}-\theta_{10})} \quad (70)$$

$$\Omega_2 = e^{j(\Delta\omega)(t+\tau_2+\tau_r)+(\theta_{21}-\theta_{20})} \quad (71)$$

Next, a complex conjugate multiplication is formed between these two terms, so as to realize equation (72) as:

$$\Psi = \Omega^*_1 \sim \Omega_2 = e^{-j(\Delta\omega)(t+\tau_1+\tau_r)-(\theta_{11}-\theta_{10})} \sim e^{j(\Delta\omega)(t+\tau_2+\tau_r)+(\theta_{11}-\theta_{20})} = e^{j(\Delta\omega)(\tau_2-\tau_1)+(\theta_{21}-\theta_{20}-\theta_{11}+\theta_{10})} \quad (72)$$

Expression (72) reveals that the receiver processing time delay terms cancel each other out.

It is next necessary to calibrate out the phase terms $\Theta_{21}-\Theta_{20}-\Theta_{11}-\Theta_{10}$. These terms are residual phase terms that are introduced by the generation of the individual tones at the beacon sites. As pointed out above, these terms are readily calibrated out by using known values of $\tau_1$ and $\tau_2$. A relatively convenient technique is to physically place the mobile receiver at an a priori point that is exactly halfway between the two beacon sites so that $\tau_1=\tau_2$. This makes the calibration error term E defined in equation (73) as:

$$E = e^{j(\theta_{21}-\theta_{20}-\theta_{11}+\theta_{10})} \quad (73)$$

Determining the error term is straightforward, and once it has been generated, the value of $\Psi$ is modified as shown in equation (74).

$$\Psi' = E^* \sim \Psi = e^{-j(\theta_{21}-\theta_{20}-\theta_{11}+\theta_{10})} \sim e^{j(\Delta\omega)(\tau_2-\tau_1)+(\theta_{21}-\theta_{10}-\theta_{11}+\theta_{11}+\theta_{10})} = e^{j(\Delta\omega)(\tau_2-\tau_1)} \quad (74)$$

Next, the phase argument $\phi=(\Delta\omega)(\tau_2-\tau_1)$ is extracted and, as described above with reference to equation (13), the solution for the time difference is again realized in equation (75) as:

$$\Delta\tau = \tau_2 - \tau_1 = -\frac{\phi}{\Delta\omega} \quad (75)$$

For time of arrival processing, the signal $S_1$ of equation (1) is again repeated in equation (76).

$$S_1 = e^{j\omega_{10}t+\theta_{10}} + e^{j\omega_{11}t+\theta_{11}} \quad (76)$$

After undergoing a propagation delay, the signal $S'_1$ arriving at the receiver is defined in equation (77) as:

$$S'_1 = e^{j\omega_{10}(t+\tau_1+\tau_r)+\theta_{10}} + e^{j\omega_{11}(t+\tau_1+\tau_r)+\theta_{11}} \quad (77)$$

where $\tau_r$ is the receiver processing delay.

Next, each tone is separately demodulated using the demodulation signals $D_{10}$ and $D_{11}$ respectively set forth in equations (78) and (79)

$$D_{10} = e^{-j\omega'_{10}t} \quad (78)$$

$$D_{11} = e^{-j\omega'_{11}t} \quad (79)$$

As pointed out above, this demodulation is most readily accomplished by using a Fast Fourier Transform processor, although other techniques may be alternatively employed. Proceeding with the modulation, the following demodulation signals $\Omega_{10}$ and $\Omega_{11}$ are obtained.

$$\Omega_{10} = e^{-j\omega'_{10}t} \sim e^{j\omega_{10}(t+\tau_1+E_r)+\theta_{10}} = e^{j(\omega_{10}-\omega'_{10})t+\omega_{10}(\tau_1+\tau_r)+\theta_{10}} \quad (80)$$

$$\Omega_{11} = e^{-j\omega'_{11}t} \sim e^{j\omega_{11}(t+\tau_1+\tau_r)+\theta_{11}} = e^{j(\omega_{11}-\omega'_{11})t+\omega_{11}(\tau_1+\tau_r)+\theta_{11}} \quad (81)$$

Next, a frequency error term that is constrained according to the following equation (82) is derived:

$$\omega_E = (\omega_{10}-\omega'_{10}) = (\omega_{11}-\omega'_{11}) \quad (82)$$

As noted above, ideally, this term should be zero but in the event it is not zero the frequency error should be the same for each frequency. This would be the case for FET processing. Equations (80) and (81) can now be rewritten as equations (83) and (84), respectively.

$$\Omega_{10} = e^{j\omega_E t+\omega_{10}(\tau_1+\tau_r)+\theta_{10}} \quad (83)$$

$$\Omega_{11} = e^{j\omega_E t+\omega_{11}(\tau_1+\tau_r)+\theta_{11}} \quad (84)$$

Next, one of the above terms is conjugated and multiplied by the other term to realize the expression (85) for $\Gamma$ as:

$$\Gamma = e^{-j\omega_E t-\omega_{10}(\tau_1+\tau_r)-\theta_{10}} \sim e^{j\omega_E t+\omega_{11}(\tau_1+\tau_r)+\theta_{11}} = e^{j(\omega_{11}-\omega_{10})(\tau_1+\tau_r)+(\theta_{11}-\theta_{10})} \quad (85)$$

As defined above with reference to equation (55), a frequency difference term $\Delta\omega$ is again defined in equation (86) as:

$$\Delta\omega = \omega_{11} - \omega_{10} \quad (86)$$

so that equation (85) may be rewritten in equation (87) as:

$$\Gamma = e^{j\Delta\omega(\tau_1+\tau_r)+(\theta_{11}-\theta_{10})} = e^{j\Delta\omega\tau_1+(\Delta\omega\cdot\tau_r+\theta_{11}-\theta_{10})} \quad (87)$$

The error term E, which must be calibrated out, is defined in equation (88) as:

$$E = e^{j(\Delta\omega\cdot\tau_r+\theta_{11}-\theta_{10})}, \quad (88)$$

so that the calibrated signal $\Gamma'$ becomes $$\Gamma' = E^* \sim e^{j\Delta\omega\tau_1+(\Delta\omega\cdot r+\theta_{11}-\theta_{10})} = e^{j\Delta\omega r} \quad (89)$$

Next, the phase argument $\phi=(\Delta\omega)\tau_1$ is extracted and the time difference is solved as set forth in equation (90) thereby extracting the time of arrival as intended.

$$\tau_1 = -\frac{\phi}{\Delta\omega} \quad (90)$$

As pointed out above, since the processing delay does not naturally cancel itself out in the course of receiver signal processing, it must be calibrated out by a separate processing step in the receiver.

As will be appreciated from the foregoing description, the present invention provides a technique for geolocating (mobile) objects within an environment where other locating systems, such as GPS-based systems, may not be expected to operate successfully, by the use of at least three transmitter sites whose geolocations are fixed and known, and which transmit dual frequency beacons that are readily received by a mobile receiver within the environment of interest. The object's receiver processes the three sets of received signals by measuring the phase differences among respective pairs of the beacons, and then processes these phase differences to perform time difference of arrival-based or time of arrival-based distance information to locate the object relative to the beacons sites. Phase errors or offsets are readily calibrated out, to realize geolocation information at the mobile receiver. The receiver may be equipped with an auxiliary transponder which transmits its calculated location to a location outside the building, so as to facilitate tracking the object.

While I have shown and described several embodiments in accordance with the present invention, it is to be understood that the same is not limited thereto but is susceptible to numerous changes and modifications as known to a person skilled in the art. I therefore do not wish to be limited to the details shown and described herein, but intend to cover all such changes and modifications as are obvious to one of ordinary skill in the art.

What is claimed is:

1. A system for locating an object comprising:
   a plurality of geographically dispersed beacon transmitters, each of which is operative to transmit a respectively different pair of frequencies, wherein the difference between each respectively different pair of frequencies is the same; and
   a receiver located with said object and being operative to receive respectively different pairs of frequencies as transmitted by said beacon transmitters and to derive therefrom information representative of the location of said object.

2. The system according to claim 1, wherein said object comprises a mobile object that is movable in an environment where global positioning satellite signaling is substantially impaired or inoperative.

3. The system according to claim 1, wherein said receiver is operative to process said respectively different pairs of frequencies as transmitted by said beacon transmitters to derive therefrom time of arrival information from which the location of said object may be derived.

4. The system according to claim 1, wherein said receiver is operative to process said respectively different pairs of frequencies as transmitted by said beacon transmitters to derive therefrom time difference of arrival information from which the location of said object may be derived.

5. The system according to claim 1, wherein said receiver is operative to calibrate out residual phase terms associated with the generation said respectively different pairs of frequencies as transmitted by said beacon transmitters.

6. The system according to claim 1, wherein a respective beacon transmitter comprises a double sideband, suppressed carrier modulator that is operative to transmit a respective pair of frequencies that is different from a respective pair of frequencies transmitted by any other beacon transmitter of said plurality of beacon transmitters.

7. The system according to claim 6, wherein each double sideband, suppressed carrier modulator is referenced to a common source frequency generator.

8. The system according to claim 6, wherein said receiver includes a Fast Fourier Transform processor that is operative to measure frequency offset of received signals and a frequency shifting digital signal processor that is operative to remove residual frequency error.

9. The system according to claim 1, wherein time of transmission between beacons is measured to provide for phase compensation for each beacon.

10. A system for locating an object comprising:
    at least three geographically dispersed beacon transmitters, each of which is operative to transmit a respectively different pair of frequencies, such that the difference between each respectively different pair of frequencies is the same; and
    a receiver located with said object and being operative to receiver respectively different pairs of frequencies as transmitted by said at least three beacon transmitters and to derive therefrom information representative of the location of said object.

11. The system according to claim 10, wherein said object comprises a mobile object that is movable in an environment where global positioning satellite signaling is substantially impaired or inoperative.

12. The system according to claim 10, wherein said receiver is operative to process said respectively different pairs of frequencies as transmitted by said beacon transmitters to derive therefrom time of arrival information from which the location of said object may be derived.

13. The system according to claim 10, wherein said receiver is operative to process said respectively different pairs of frequencies as transmitted by said beacon transmitters to derive therefrom time difference of arrival information from which the location of said object may be derived.

14. The system according to claim 10, wherein said receiver is operative to calibrate out residual phase terms associated with the generation said respectively different pairs of frequencies as transmitted by said at least three beacon transmitters.

15. The system according to claim 10, wherein a respective beacon transmitter comprises a double sideband, suppressed carrier modulator that is operative to transmit a respective pair of frequencies that is different from a respective pair of frequencies transmitted by any other beacon transmitter of said at least three beacon transmitters.

16. The system according to claim 15, wherein each double sideband, suppressed carrier modulator is referenced to a common source frequency generator.

17. The system according to claim 15, wherein said receiver includes a Fast Fourier Transform processor that is operative to measure frequency offset of received signals and a frequency shifting digital signal processor that is operative to remove residual frequency error.

18. A method of locating an object comprising the steps of:
    (a) geographically distributing at least three beacon transmitters in the vicinity of an environment where global positioning satellite signaling is substantially impaired or inoperative;
    (b) causing each of said at least three beacon transmitters to transmit a respectively different pair of frequencies, such that the frequency difference between each respectively different pair of frequencies is the same; and
    (c) providing said object with a receiver that is operative to receive respectively different pairs of frequencies as transmitted by said at least three beacon transmitters and to derive therefrom information representative of the location of said object within said environment.

19. The method according to claim 18, wherein said receiver is operative to calibrate out residual phase terms associated with the generation said respectively different pairs of frequencies as transmitted by said at least three beacon transmitters.

20. The method according to claim 18, wherein a respective beacon transmitter comprises a double sideband, suppressed carrier modulator that is operative to transmit a respective pair of frequencies that is different from a respective pair of frequencies transmitted by any other beacon transmitter of said at leas three beacon transmitters.

* * * * *